United States Patent [19]

Schultz et al.

[11] 4,447,173

[45] May 8, 1984

[54] APPARATUS FOR BURYING DRIP IRRIGATION TUBING

[76] Inventors: Charles R. Schultz, Rte. 1, Box 115A, Coolidge, Ariz. 85228; Mark S. Tollefson, 508 East Irene, Casa Grande, Ariz. 85222; Howard A. Wuertz, Rte. 1, Box 115A, Coolidge, Ariz. 85228

[21] Appl. No.: 467,383

[22] Filed: Feb. 17, 1983

[51] Int. Cl.³ .............................................. E02F 5/10
[52] U.S. Cl. ................................... 405/181; 405/174; 405/180; 405/36
[58] Field of Search ......................... 405/36, 174–182, 405/43, 45; 111/1, 6, 7; 172/40

[56] References Cited

U.S. PATENT DOCUMENTS

| 2,118,553 | 5/1938 | Garlinger | 405/181 |
| 3,313,115 | 4/1967 | Kniefel | 405/180 |
| 3,395,545 | 8/1968 | Mendaloff | 405/178 |
| 3,437,061 | 4/1969 | Wells | 111/1 |
| 3,497,016 | 2/1970 | Ryan | 405/180 X |
| 3,533,366 | 10/1970 | Francom | 111/7 |
| 3,799,217 | 3/1974 | Bauer | 405/36 X |
| 3,811,387 | 5/1974 | Meiners | 111/1 |
| 3,813,888 | 6/1974 | Purviance | 405/180 |

Primary Examiner—Dennis L. Taylor
Attorney, Agent, or Firm—Drummond & Nissle

[57] ABSTRACT

Apparatus for simultaneously burying multiple strands of conduit in a plowed field. The plowed field includes spaced, elongate, generally parallel upstanding beds. A furrow lies in between each adjacent pair of beds. The apparatus buries conduit in the beds.

2 Claims, 7 Drawing Figures

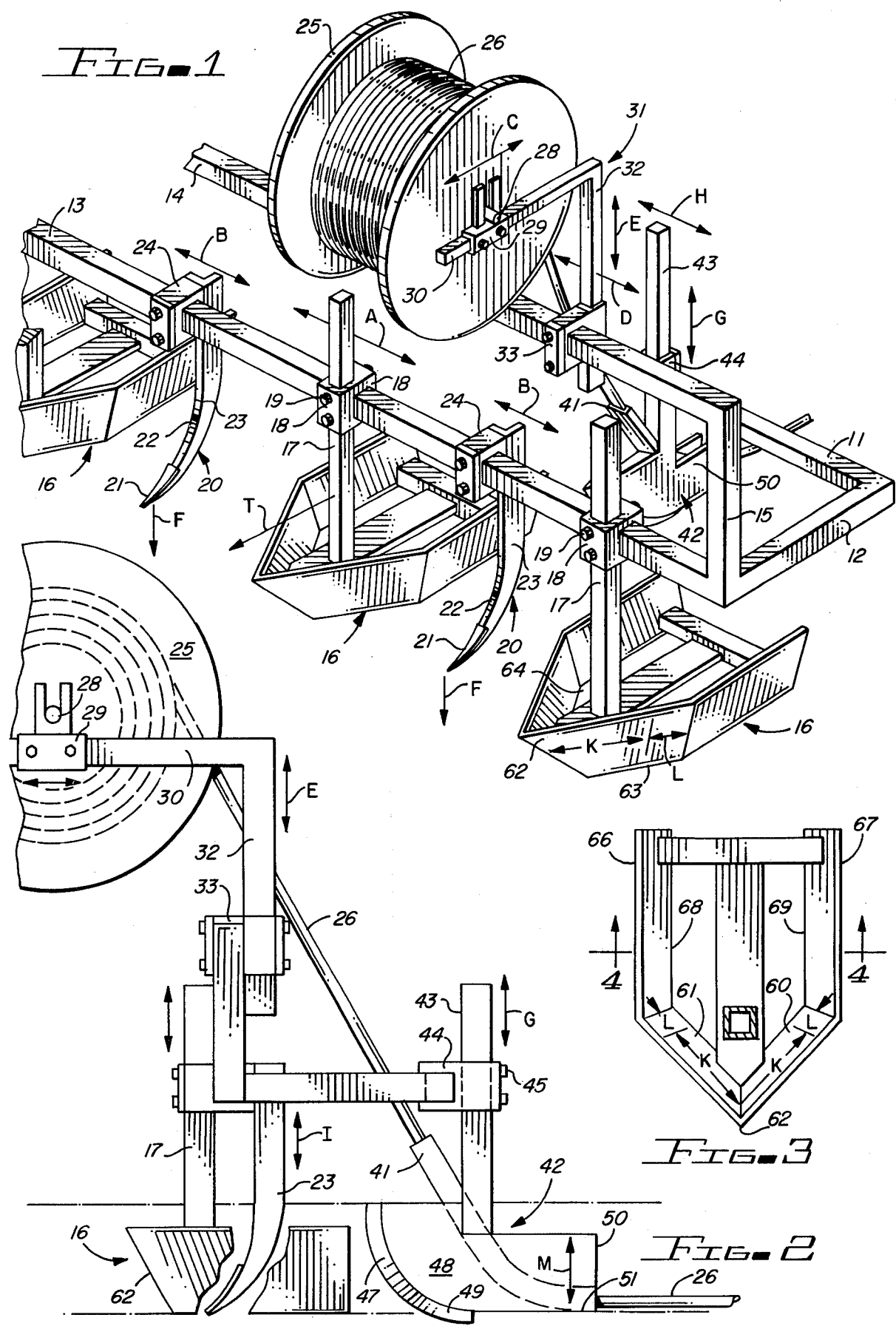

APPARATUS FOR BURYING DRIP IRRIGATION TUBING

This invention relates to apparatus for burying conduit.

More particularly, the invention relates to apparatus for burying conduit in a plowed field, the field including alternating generally parallel furrows and elongate upstanding beds of earth, each elongate bed generally lying along and following a horizontally oriented imaginary line passing through the center of the bed.

In another respect, the invention relates to conduit burying apparatus of the type described which buries a length of conduit in a bed along a line generally parallel to the horizontal imaginary centerline passing through the bed.

In still a further respect, the invention pertains to apparatus for simultaneously burying each of multiple strands of conduit in one of the beds of a plowed field, the apparatus including members which ride in and track along the furrows of the field such that the conduit is generally continuously laid in the beds at the same depth and lateral position along the entire length of the beds.

In yet another respect, the invention relates to conduit burying apparatus of the type described in which the furrow tracking members compact the beds as the members move along the furrows, the compacting of the beds facilitating the distribution of water throughout the beds by capillary action when water flows from drip irrigation tubing or conduit which has been buried in the beds.

In yet still another respect, the invention relates to apparatus which, while burying conduit in the beds of a plowed field, maintains the original contour of the beds and facilitates the planting of seeds in the beds after conduit has been buried therein.

Equipment for burying conduit is well known in the art. See for example U.S. Pat. Nos. 2,118,553 to Garlinger, 2,722,181 to Hash, 3,313,115 to Kniefel, 3,391,545 to Linneman, 3,668,879 to Ogle, and 3,849,999 to Coffey. The apparatus described in these patents has several limitations. The apparatus is designed to dispense a single strand of conduit and cannot be utilized to simultaneously bury multiple strands of conduit. Further, when perforated drip irrigation tubing is being buried in the beds of a plowed field, it is important that the tubing be buried at a relatively constant depth and lateral position along the entire length of the bed. In order to bury tubing at a fixed depth along the length of a bed, the apparatus burying the conduit must accurately track along the furrows in the field and maintain itself in position at a constant height above the top of the ground. Prior art apparatus is not constructed to bury conduit at a constant depth while tracking along the furrows of a plowed field.

Another important objective associated with burying drip irrigation tubing in the beds of a plowed field is to maintain the original contour of the beds so that after a length of tubing has been buried in each of the beds, seeds may immediately be sown in the beds. Prior art apparatus often will destroy the original contour of a bed while forming a trench in the bed to receive conduit. One reason prior art apparatus greatly alters the contour and shape of a bed is that the blade utilized on the apparatus to form the trench in the bed is shaped such that corn stalks, cotton stalks or other organic matter accumulates on the blade. As organic material accumulates on the blade, the material enlarges and deforms the trench cut in the bed by the blade.

Finally, to efficiently utilize water from drip irrigation tubing buried therein, beds should, if possible, be further compacted after they have been formed when plowing a field. When beds are properly compacted, water seeping from drip irrigation tubing readily spreads throughout the entire bed by capillary action. Prior art apparatus does not appear to provide means for compacting beds while conduit is being laid therein.

Accordingly, it would be highly desirable to provide improved conduit laying apparatus which would, while burying conduit in the beds of a plowed field, accurately track along the furrows between the beds and bury conduit in the beds at a relatively uniform depth along the length of the beds.

It would further be highly desirable to provide conduit laying apparatus which would, while burying conduit in the beds of a plowed field, maintain the original contour of and compact the beds.

Therefore, it is a principal object of the invention to provide improved conduit burying apparatus.

Another object of the instant invention is to provide improved conduit burying apparatus which can simultaneously bury multiple strands of conduit in a plowed field, the plowed field including alternating furrows and upstanding, generally parallel elongate beds, each strand of conduit being buried in one of said beds.

A further object of the invention is to provide improved conduit laying apparatus which, while burying a strand of conduit in one of the beds in a plowed field, accurately tracks the furrows in the field and buries each strand of conduit in one of the beds at a relatively constant depth and location along the entire length of the bed.

Still another object of the invention is to provide improved conduit laying apparatus which generally maintains the original contour of the beds in a plowed field while burying conduit therein.

Yet a further object of the invention is to provide improved conduit laying apparatus which, while burying a strand of conduit in one of the beds of a plowed field, compacts the bed to improve distribution of water through the bed by capillary action.

These and other, further and more specific objects and advantages of the invention will be apparent to those skilled in the art from the following detailed description thereof, taken in conjunction with the invention drawings, in which:

FIG. 1 is a perspective view of a portion of apparatus constructed in accordance with the principles of the invention and constituting the presently preferred embodiment and best mode thereof;

FIG. 2 is a side elevation view of the apparatus of FIG. 1 illustrating further construction details thereof;

FIG. 3 is a top view of one of the furrow tracking members of the apparatus of FIG. 1;

Figure 4A:
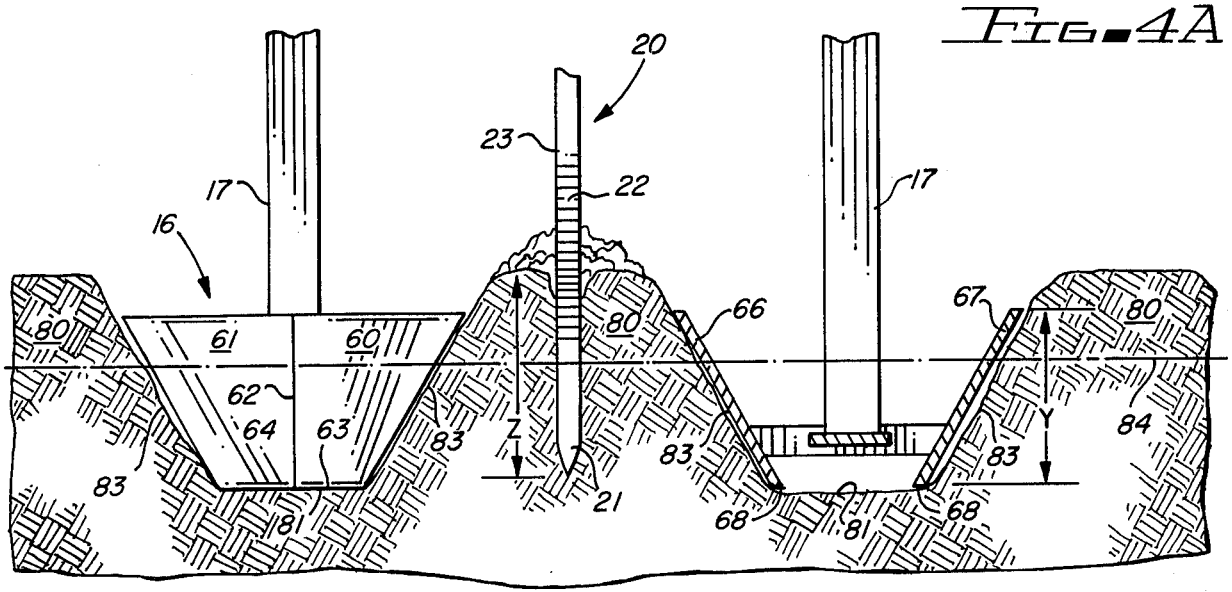
FIG. 4A is a schematic cross sectional view illustrating the mode of operation of the invention in a plowed field having alternating parallel furrows and beds, the section line being made perpendicular to the longitudinal axes of the beds and furrows of the field such that the longitudinal axes of the beds in FIG. 4A are generally perpendicular to the plane of the paper.

Briefly, in accordance with the invention, we provide improved apparatus for burying conduit in a plowed field. The field comprises a plurality of elongate, upstanding, spaced beds of earth and a plurality of elongate spaced furrows, each furrow generally lying along and following a generally horizontally oriented imaginary line, each elongate bed normally lying between a pair of the furrows. The improved conduit burying apparatus includes a frame; a plurality of spaced members carried on the frame and each shaped, contoured and dimensioned to track along one of said furrows in a direction of travel generally parallel to said imaginary horizontally oriented line; at least one blade carried on the frame to cut a trench in one of the beds as the apparatus moves in the direction of travel and shaped to generate a downward pull on the apparatus as the blade cuts through the bed to form a trench; and, a conduit laying member carried on the frame and shaped and dimensioned to track along the trench formed by the blade and to allow conduit to move therethrough from a supply thereof to be dispensed into the trench formed by the blade. The tracking members and conduit laying member have bottom edges which respectively contact the furrow and trench. These bottom edges counteract the downward pull generated by the blade so that the depth of the trench being cut in the bed tends to be substantially constant along the length thereof. The furrow tracking members can be shaped and dimensioned such that each member compacts at least a portion of the beds immediately to either side of a furrow while tracking therealong.

Turning now to the drawings, which depict the presently preferred embodiment and best mode of the invention for the purpose of illustrating the practice thereof and not by way of limitation of the scope of the invention and in which like reference characters illustrate corresponding elements throughout the several views, FIG. 1 illustrates a section of conduit burying apparatus constructed in accordance with the invention and including an L-shaped frame having horizontally oriented bars 11-14 and vertical bar 15. Furrow tracking members 16 are carried by vertical arms 17 adjustably secured to bar 13 by brackets 18. As indicated by arrows A, brackets 18 can be slid horizontally along bar 13 to any desired position. Set screws in the back of brackets 18 are tightened against bar 13 and utilized to detachably secure brackets 18 in any desired position along bar 13. Similarly, set screws 19 on the face of brackets 18 can be loosened so that vertical bars 17 may be upwardly or downwardly slid through brackets 18 to adjust the distance of furrow tracking members 16 below bar 13. When furrow tracking members 16 are adjusted to a desired position, set screws 19 are tightened against rods 17. Arms 20 carry blades 21. The concave curvature of the leading edge of each arm 22 causes blades 21 to generate a downward force, indicated by arrows F, on the apparatus of FIG. 1 when blades 21 cut through earth as the apparatus is pulled in the direction of travel indicated by arrow T. Arms 20 are carried by brackets 24 which permit the position of arms 20 to be slidably adjusted along arm 13 as indicated by arrows B. Set screws in brackets 24 fixedly adjustably secure brackets 24 in any desired position along rod 13. If desired, the upper end of each arm 20 and brackets 24 could be adapted so that the position of blade 21 could, as indicated by arrows I in FIG. 2, be vertically adjusted with respect to rod 13.

The side surfaces 23 of arms 20 are smooth from blade 21 up to a point which is positioned above a bed 80 when blade 21 is cutting a trench in the bed. The forward concave curvature of arm 23, in addition to the smooth surfaces 23 and 22 of each blade, generally eliminates or minimizes the buildup of organic matter on the arms 20. Lengths of cotton stalks or other organic material in the ground which wrap around arm 20 as arm 20 moves through a bed tend to slide up arm 20 to a point above the bed. This prevents organic material from accumulating just above blade 21 and consequently causing the trench formed by blade 21 to be enlarged and misshapen.

Axle 28 of roll 25 of conduit 25 is rotatably supported at either end by a bracket 29 detachably slidably carried on horizontal arm 30 of L-shaped support member 31. As indicated by arrows C, bracket 29 can be horizontally slidably positioned along arm 30. Set screws in bracket 29 detachably fixedly secure bracket 29 in any desired position along arm 30. L-shaped arm 31 on the far side of roll 25 is not visible in FIG. 1. Vertical segment 32 of each arm 31 is slidably received by a bracket 33 which can, as indicated by arrows D, be slidably moved along rod 14 to any desired position and secured by tightening set screws in bracket 33 against rod 14. Segment 32 of arm 31 can be vertically slidably adjusted through bracket 33 as indicated by arrows E. When segment 32 is in the desired position set screws in bracket 33 are tightened thereagainst.

Conduit 26 from roll 25 moves through sleeve 41 on conduit dispensing member 42. As shown in FIG. 1, when conduit 26 is flat or is any other non-cylindrical shape, the inner channel in sleeve 41 through which conduit 26 travels is formed in a shape similar to that of conduit 26 so conduit 26 will not twist or rotate while passing through sleeve 41. Conduit dispensing member 42 is carried by shaft 43 which is received by and is, as indicated by arrows G, vertically adjustable in bracket 44 slidably carried by rod 11. Set screws 45 in bracket 44 tighten against and secure rod 43 in any desired position. Bracket 44 slides along rod 11 in the directions indicated by arrows H. Set screws in bracket 44 are tightened against rod 11 to secure bracket 44 in position thereon.

Figure 5:
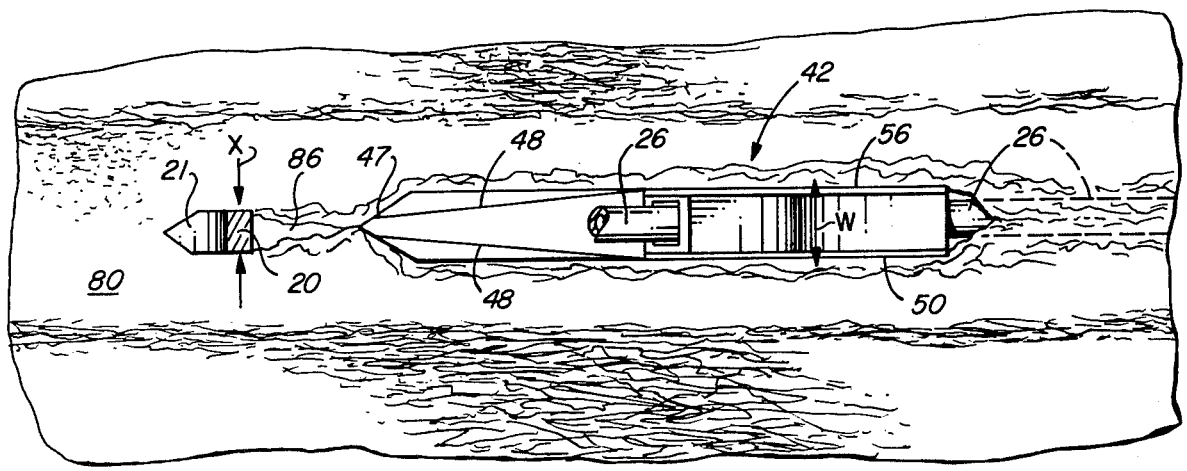

Conduit dispensing member 42 is, as indicated in FIGS. 1 and 5, positioned directly behind blade 21 so that leading edge 47 of member 42 travels along the trench formed in a bed 80 by blade 21 and arm 20. Faces 48 of conduit dispensing members 42 are smooth so that pieces of organic material will not accumulate thereon and cause the trench formed by blade 47 to be enlarged. The convex shape of blade 47 causes stalks contacted by blade 47 to travel downwardly to the bottom of the trench and either be run over by the lower portion 49 of blade 47 or to be cut into two portions by blade 47 and left behind in the trench formed by blade 21 as the apparatus moves in the direction of travel indicated by arrow T in FIG. 1. The trailing end of each conduit dispensing member 42 is U-shaped and, as shown in FIGS. 1, 2 and 5, includes upstanding walls 50 attached at their lower generally horizontal edges to a rectangular flat plate 51. The bottom of plate 51 defines a generally horizontally oriented plane which, while the apparatus is traveling in direction T of FIG. 1, forms an elongate flat conduit-receiving surface at the bottom of the trench formed by blade 21. Conduit 26 is dispensed onto the receiving surface. When conduit 26 is relatively flat, as is perforated tubing for drip irrigation, the flat receiving surface formed by plate 51 helps prevent tubing 26 from twisting as it is fed from member 42.

Figure 4B:
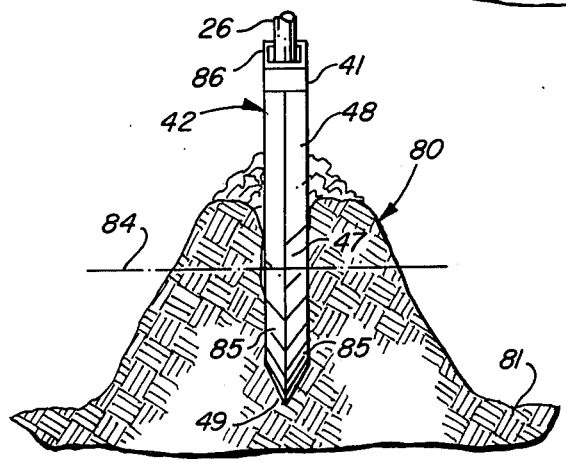
FIG. 4B is a schematic cross sectional view of one of the beds of FIG. 4A illustrating one of the tube laying members of the apparatus of the invention passing therethrough.
Figure 4C:
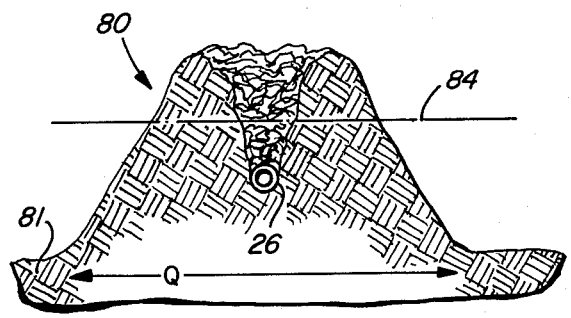
FIG. 4C is a schematic cross sectional view of the bed of FIG. 4B depicting the bed after the apparatus of the invention has buried conduit therein; and, FIG. 5 is a top view of a bed illustrating a blade and a tube laying member of the apparatus of the invention passing through the bed and burying tubing therein.

In FIG. 5, the width W of the trailing portion of conduit dispensing member 42 is greater than the width of the cutting edge 47 of member 42. The divergence of the width of conduit dispensing member 42 from the cutting edge 47 back to the trailing portion of member 42 plays an important part in promoting the automatic filling of the trench formed by blade 21 after conduit 26 has been dispensed into the trench. The width of cutting edge 47 of conduit dispensing member 42 is generally equal to or less than the width, indicated by arrows X in FIG. 5, of arm 20 or blade 21. The width W of the trailing edge of member 42 is greater than the width X of arm 20. As a result, when member 42 travels through the trench formed by blade 21, the trailing portion of member 42 forces the walls of the trench further apart. The elastic nature of the dirt in the bed causes the dirt in the walls of the trench to compress against walls 50 of member 42 so that after member 42 has passed through the trench, the walls of the trench tend to collapse as indicated in FIG. 4C and fill the trench with dirt.

As shown in FIGS. 1, 3 and 5, furrow tracking members 16 each include panel members 60, 61 which join to form leading edge 62. Members 60, 61 have lower ground engaging edges 63, 64, respectively. Prior art furrow tracking members have a standard length indicated by arrows K in FIG. 3. Furrow tracking members 16 of the invention have extended this standard length K by an amount indicated by arrows L in FIG. 2. Additional length L on each member 60, 61 along with generally parallel wings 66, 67 causes member 16 to compact side walls 83 of beds 80 as member 16 moves along a furrow. Wings 66, 67 have lower earth engaging edges 68, 69, respectively. The amount L by which members 60, 61 are lengthened, and the length of wings 66, 67 could, of course, be varied depending on the size of the furrow and the amount of compaction of the beds desired. As is indicated in FIG. 4A, the height Y of each wing 66, 67 is approximately equivalent to the height from the bottom of the furrow to the top of a bed. Height Y could be varied as desired.

The height M of the trailing end of member 42 (FIG. 2) is presently preferably less than the height of the trench being formed in each bed because the trailing end then tends to expand only the walls of the lower portion of the trench. The expansion of the lower walls of the trench tends to cause the upper walls of the trench to collapse and fill the trench after member 42 has passed through the trench.

In FIG. 1, furrow tracking members 16 are presently spaced apart from one another on forty inch centers. Similarly, blades 21 are spaced apart from one another on 40 inch centers. Each blade 21 and arm 20 has a tracking member 42 positioned directly behind it as indicated in FIGS. 1 and 5.

Before the invention is utilized, a field is plowed to form a series of spaced, generally parallel, elongate, pyramid-shaped beds 80. Each pair of beds 80 normally has an elongate furrow 81 therebetween. The apparatus of FIG. 1 is then positioned at the edge of the field with members 16 in furrows 81; is connected to a tractor or other vehicle; and is pulled a short distance in a direction of travel generally parallel to the elongate beds and furrows. After the apparatus is pulled a short distance and stopped, one to two feet of tubing are manually pulled through sleeve 41 and out the trailing end of each member 42 and buried by hand or with a hoe or other tool in the trench formed in bed 80 by blade 21 and member 42. The first few feet of tubing 26 buried in a bed 80 is sufficient to pull tubing 26 from a roll 25 through sleeve 41 when the apparatus is moved away from the buried tubing in the original direction of travel. As the apparatus moves away from the manually buried tubing, tracking members 16 travel in furrows 81 and blades 21 and members 42 generally pass through the center of beds 80.

FIG. 4A illustrates how members 60, 61, 66, 67 compact the sides 83 of beds 80 as tracking members 16 move along furrows 81. Lower edges 63, 64, 68, 69 of members 16 travel along furrows 81. Blade 21 and arm 20, or a portion thereof, cut a trench in bed 80. In FIGS. 4A-4C the ground level existing before the field was plowed is indicated by broken line 84.

FIG. 4B illustrates a conduit dispensing member 42 passing through a trench formed in bed 80.

FIG. 4C illustrates a bed 80 after the apparatus of the invention has buried a strand of tubing 26 therein. If desired, the apparatus could be modified to bury two or more lengths of tubing in a single bed 80, and could be modified to bury multiple strands of tubing in a single bed 80 at differing depths and lateral positions.

The height M (FIG. 2 of the trailing portion of member 42 is preferably less than the depth Z (FIG. 4A) of the trench cut in bed 80 by blade 21. Since flat bottom plate 51 of the trailing portion of member 42 preferably has a width W greater than width X (FIG. 5) of blade 21 or shaft 20, walls 50 of the trailing portion of member 42 force apart lower walls 85 (FIG. 4B) of the trench 86 formed by blade 21 and arm 20. The outward forcing of lower walls 85 of trench 86 promotes filling of trench 86 after tubing 26 has been dispensed therein. After member 42 passes through trench 86, the upper walls of the trench 86 tend, as shown in FIG. 4C, to collapse and cover conduit 26 lying at the bottom of the trench.

In FIG. 4B, the mouth 86 of sleeve 41 is above the top of bed 80 when member 42 is moving through the bed. This prevents earth from entering sleeve 41 with conduit 26.

When the apparatus shown in the drawings is being moved across a plowed field in the direction of travel indicated by arrow T in FIG. 1, the concave curvature of arm 20 causes blades 21 to generate a downward pull on the apparatus. This downward force is represented by arrows F. Flat bottom plate 51 and edges 63, 64, 68, 69 of each tracking member 16 resist the tendency of blades 21 to pull the apparatus into the ground. As a result, the apparatus tends to dig trenches of substantially uniform depth in beds 80 and, consequently, to bury conduit 26 at a uniform depth in each bed 80. In sandy soils, a flat bottom plate can be attached to and span the space between bottom edges 63, 64, 68, 69 of each furrow tracking member 16. Such a generally horizontally oriented bottom plate member would ride along furrow 81 and further resist any tendency of the apparatus to be gradually "nosed into" the ground by the downward pull F generated as blades 21 move through the earth.

When conduit 26 being buried in beds 80 consists of hollow, perforated tubing utilized to provide drip irrigation in beds 80, it is especially important that the tubing be buried in each bed 80 at a relatively constant depth and at a location generally at the center of the lateral width Q (FIG. 4C) of bed 80. If the depth or location of perforated drip irrigation tubing varies too widely, water seeping through perforations in the tubing will tend to not uniformly disperse throughout bed 80 along the entire length thereof. A particular advantage of the invention is that, in addition to generally burying tubing 26 at a uniform depth in beds 80, the apparatus tracks accurately along furrows 81 and has only minimal tendency to weave back and forth while burying conduit 26. Wings 66, 67 of members 16 contribute to the lateral stability of the apparatus. The large surface area between members 66, 67 and sides 83 of beds 80 counteracts any tendency of the apparatus to weave from side to side as it moves across a field. If beds 80 and furrows 81 are straight, then the apparatus buries conduit 26 in beds 80 along a straight line.

The position of conduit carrying rolls 25 can, as shown in FIG. 1, be horizontally and vertically adjusted. This feature of the apparatus is useful when different sized rolls of conduit are employed or when different spacings between bars 32 or other elements of the apparatus are utilized.

As would be appreciated by those of skill in the art, the apparatus can be modified to dispense round, flat or any other shape of conduit. The conduit can be hollow or have a solid core of wiring or other material. However, the conduit dispensed by the apparatus of the invention must have some flexibility in order to travel through curved sleeve 41.

In FIG. 2, sleeve 41 includes a polyethylene liner positioned between conduit 26 and the interior surfaces of sleeve 41. The polyethylene liner minimizes frictional drag between conduit 26 and sleeve 41 and also, when sleeve 41 is fabricated from metal, prevents metal burrs on the inside of sleeve 41 from cutting or tearing conduit 26 passing through sleeve 41. Although conduit 26 is generally vertically oriented when it enters sleeve 41, conduit 26 is, due to the curve in sleeve 41, horizontally oriented when it is dispensed from sleeve 41 onto the ground. The curve in sleeve 41 should be gradual and smooth so that friction between sleeve 41 and conduit 26 is minimized. This is particularly true when the apparatus shown in the drawings is being utilized to dispense plastic drip irrigation tubing. If there is too much friction between the drip irrigation tubing and sleeve 41, the tubing can be stretched.

In FIGS. 1 and 2, furrowing tracking members 16 can, of course, be carried on bar 11 or any other desired structural component of the apparatus.

Having described our invention in such terms as to enable those skilled in the art to understand and practice it and having identified the presently preferred embodiments and best mode thereof, we claim:

1. Apparatus for burying conduit from a supply thereof in a plowed field having
    a plurality of generally parallel elongate, upstanding, spaced beds of earth, and
    a plurality of elongate spaced furrows, each furrow generally lying along and following a generally horizontally oriented imaginary line,
each elongate bed generally lying in between a pair of said furrows, said apparatus comprising
    (a) a frame,
    (b) a plurality of members carried on said frame and each shaped, contoured and dimensioned to track along one of said furrows in a direction of travel generally parallel to said imaginary horizontally oriented line;
    (c) at least one blade carried on said frame to cut a trench in one of said beds as said apparatus moves in said direction of travel and shaped to generate a downward pull on said apparatus as said blade cuts through said bed to form said trench; and
    (d) a conduit laying member carried on said frame and shaped and dimensioned to
        (i) track along said trench formed by said blade,
        (ii) allow conduit to move therethrough to be dispensed into said trench formed by said blade;
said tracking members and said conduit laying member having bottom edges which contact said furrows and trench respectively and tend to counteract said downward force generated as said blade moves through said earth in said bed such that the depth of said trench being cut in said bed tends to be substantially constant along the length thereof.

2. The apparatus of claim 1 wherein said blade is carried on said conduit laying member.

* * * * *